(12) United States Patent
Rahner et al.

(10) Patent No.: US 12,528,347 B2
(45) Date of Patent: Jan. 20, 2026

(54) METHOD FOR CONTROLLING A COOLING SYSTEM, COOLING SYSTEM, CONTROL UNIT, AND COMPUTER PROGRAM PRODUCT

(71) Applicant: Schaeffler Technologies AG & Co. KG, Herzogenaurach (DE)

(72) Inventors: Jens Rahner, Gaggenau (DE); Matthias Bauer, Freiburg (DE); Peter Maximilian Schnorrenberg, Erftstadt (DE); Denis Loktev, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 185 days.

(21) Appl. No.: 18/272,791

(22) PCT Filed: Dec. 1, 2021

(86) PCT No.: PCT/DE2021/100954
§ 371 (c)(1),
(2) Date: Jul. 17, 2023

(87) PCT Pub. No.: WO2022/156841
PCT Pub. Date: Jul. 28, 2022

(65) Prior Publication Data
US 2024/0157780 A1    May 16, 2024

(30) Foreign Application Priority Data
Jan. 19, 2021    (DE) .................... 10 2021 100 958.8

(51) Int. Cl.
*B60K 1/00*        (2006.01)
*B60K 11/02*       (2006.01)

(52) U.S. Cl.
CPC ................ *B60K 11/02* (2013.01); *B60K 1/00* (2013.01); *B60K 2001/006* (2013.01)

(58) Field of Classification Search
CPC .... B60K 2001/006; B60K 11/02; B60K 11/00
See application file for complete search history.

(56) References Cited

U.S. PATENT DOCUMENTS

| 3,709,289 A | 1/1973 | Weatherston |
| 2013/0153338 A1 | 6/2013 | Yamauchi |

(Continued)

FOREIGN PATENT DOCUMENTS

| DE | 102005040771 A1 | 3/2007 |
| DE | 102013223531 A1 | 6/2014 |

(Continued)

OTHER PUBLICATIONS

Jens Rahner, "Entwicklung Einer Kuhlstrategie Fur Ein Dediziertes Hybridgetriebe," Hochschule Konstanz, Schaeffler, 2020, 88 Pages.

*Primary Examiner* — Kenneth M Dunne

(57) ABSTRACT

A method for controlling a cooling system of a first electrical machine within a drive train of a motor vehicle is provided. The cooling system includes: i) a first closed coolant circuit having a first cooling fluid and a first fluid pump for conveying the first cooling fluid through the first coolant circuit and for cooling at least the first electrical machine, and ii) a control unit which is connected to the first fluid pump in order to control the pump speed.

20 Claims, 5 Drawing Sheets

(56) References Cited

U.S. PATENT DOCUMENTS

| | | |
|---|---|---|
| 2019/0225076 A1 | 7/2019 | Takeno et al. |
| 2019/0296616 A1 | 9/2019 | Ohzu et al. |
| 2020/0166116 A1 | 5/2020 | Jang |
| 2021/0008982 A1* | 1/2021 | Tsukamoto ............. B60L 50/15 |

FOREIGN PATENT DOCUMENTS

| | | |
|---|---|---|
| DE | 102015214985 A1 | 2/2016 |
| DE | 102015216489 A1 | 6/2016 |
| DE | 102018117463 A1 | 1/2020 |
| DE | 102019205493 A1 | 4/2020 |
| DE | 102019216466 A1 | 4/2020 |

* cited by examiner

METHOD FOR CONTROLLING A COOLING SYSTEM, COOLING SYSTEM, CONTROL UNIT, AND COMPUTER PROGRAM PRODUCT

CROSS-REFERENCE TO RELATED APPLICATIONS

This application is the U.S. National Phase of PCT Application No. PCT/DE2021/100954 filed on Dec. 1, 2021, which claims priority to DE 10 2021 100 958.8 filed on Jan. 19, 2021, the entire disclosures of which are incorporated by reference herein.

TECHNICAL FIELD

The present disclosure relates to a method for controlling a cooling system of a first electrical machine within a drive train of a motor vehicle. The disclosure also relates to a cooling system, a control unit and a computer program product.

BACKGROUND

A drive train of a hybrid vehicle comprises a combination of an internal combustion engine and an electric motor and enables—for example in urban areas—a purely electric mode of operation with sufficient range and availability, in particular when driving overland. In addition, there is the possibility of driving the internal combustion engine and the electric motor at the same time in certain operating situations.

It is generally known that the electrical machines used in hybrid drive concepts require cooling. DE 10 2018 117 463 A1 discloses a stator for an electric motor, with a stator core, said stator core having stator laminations, wherein the stator laminations are stacked in the axial direction in relation to a motor axis, with a cooling device for cooling the stator core.

Electrical machines cooled in this way are also implemented within hybrid drive concepts in various designs of hybrid transmissions, which are also referred to as dedicated hybrid transmissions, or DHT. A characteristic of this type of transmission is, for example, reversing with the electrical machine, whereby no mechanical reverse gear is necessary.

When an automated manual transmission is designed as a Dedicated Hybrid Shift Transmission (DH-ST), the electrical machine drives the vehicle during a shifting process in the drive train of the combustion engine and enables driving without any interruption in traction. Furthermore, the electrical machine can be used for starting in both directions and the starting clutch can be designed as a compact separating clutch. In principle, it is known to arrange the electrical machine coaxially in the hybrid transmission. For example, DE 10 2005 040 771 A1 discloses a drive train of a hybrid vehicle wherein an electric motor is arranged coaxially with the drive train and wherein a dual clutch is positioned in the electric motor in a space-saving manner. The document DE 10 201 5 214 985 A1 discloses a hybrid drive module, wherein an electrical machine is also arranged coaxially. Such DHTs are also referred to as P3 hybrid modules.

There is a continuing need to efficiently and safely cool the electrically and thermally loaded components in such a hybrid module and thereby enable energy-efficient and low-$CO_2$ operation of the motor vehicle.

SUMMARY

The object of the disclosure is therefore to provide an improved method for controlling a cooling system of an electrical machine within a drive train of a motor vehicle. In particular, the object is also to implement a method for controlling a cooling system of an electrical machine within a drive train of a motor vehicle, which can be executed with the lowest possible processor performance and storage requirements in a control unit.

This object is achieved by a method for controlling a cooling system of a first electrical machine within a drive train of a motor vehicle, comprising a first closed coolant circuit having a first cooling fluid and a first fluid pump for conveying the first cooling fluid through the first coolant circuit and for cooling at least the first electrical machine, and a control unit which is connected to the first fluid pump in order to control the pump speed, wherein a1. providing a first signal which represents the temperature of the first cooling fluid,
a2. providing a second signal which represents a reference temperature of the first cooling fluid,
a3. providing a third signal which represents the temperature of the first electrical machine,
a4. providing a fourth signal which represents a reference temperature of the first electrical machine,
a5. providing a fifth signal which represents the number of revolutions of the first electrical machine,
a6. providing a sixth signal which represents a reference number of revolutions of the first electrical machine,
b1. carrying out a comparison as to whether the temperature of the first cooling fluid is less than, or less than or equal to the reference temperature of the first cooling fluid, and
c1. if the condition is met, selecting the pump speed for the first fluid pump, which corresponds to a first pump speed that can be read from a memory of the control unit, or
d1. if the condition is not met, selecting the pump speed for the first fluid pump, which corresponds to a second pump speed that can be read from a memory of the control unit,
e1. carrying out a comparison as to whether the temperature of the first electrical machine is less than, or less than or equal to the reference temperature of the first electrical machine, and
f1. if the condition is not met, selecting the pump speed for the first fluid pump, which corresponds to a third pump speed that can be read from a memory of the control unit,
g1. carrying out a comparison as to whether the number of revolutions of the first electrical machine is less than, or less than or equal to the reference number of revolutions of the electrical machine, and
h1. if the condition is not met, selecting the pump speed for the first fluid pump, which corresponds to a fourth pump speed that can be read from a memory of the control unit, and
i1. generating a control signal by means of the control unit for the first fluid pump, which sets the fluid pump to the selected pump speed.

As a result, efficient cooling of an electrical machine can be provided. In particular, the method allows it to be carried out on control units with comparatively low processor performance and memory capacity. A defined volume flow of cooling fluid in the first coolant circuit and thus a corresponding cooling capacity can be achieved via the pump speed of the fluid pump.

Furthermore, mechanical losses can also be reduced by the method according to the disclosure, for example bearing, gearing, sealing and what are termed oil or splashing losses, as can usually occur in a cooling system.

In particular, the performance availability of an electrical machine can also be increased by the optimized cooling.

A signal within the meaning of this application is an electrical or electromagnetic representation of a parameter value. This means that as a signal, in particular, a parameter read from a memory is also understood as a signal.

In an example embodiment, the pump speeds that can be read from the memory of the control unit have the following relationship to one another:
the first pump speed that can be read from a memory of the control unit is lower than the second pump speed that can be read from a memory of the control unit, and/or
the second pump speed that can be read from a memory of the control unit is lower than the third pump speed that can be read from a memory of the control unit, and/or
the third pump speed that can be read from a memory of the control unit is equal to the fourth pump speed that can be read from a memory of the control unit.

For the purposes of this application, motor vehicles are land vehicles that are moved by machine power without being restricted to railroad tracks. A motor vehicle can be selected, for example, from the group of passenger cars, trucks, small motorcycles, light motor vehicles, motorcycles, motor buses/coaches or tractors.

A hybrid electric vehicle (HEV) is an electric vehicle that is driven by at least one electric motor and another energy converter and draws energy from its electrical storage unit (battery) as well as from an additional fuel that it carries.

In the context of this application, the drive train of a motor vehicle is understood to mean all components that generate the power for driving the motor vehicle in the motor vehicle and transmit it to the road via the vehicle wheels.

The method according to the disclosure can be used in a cooling system of a hybrid module. In a hybrid module, structural and functional elements of a hybridized drive train can be spatially and/or structurally combined and preconfigured so that a hybrid module can be integrated into a drive train of a motor vehicle in a particularly simple manner. In particular, an electric motor and a clutch system, in particular with a separating clutch for engaging the electric motor in and/or disengaging the electric motor from the drive train, can be present in a hybrid module.

A hybrid module can be divided into the following categories P0-P4 depending on the point of engagement of the electric motor in the drive train:
P0: the electric motor is arranged upstream of the internal combustion engine and is coupled to the internal combustion engine by means of a belt, for example. With this arrangement of the electric motor, it is also sometimes referred to as a belt-driven starter generator (BSG),
P1: the electric motor is arranged directly behind the internal combustion engine. The electric motor can be arranged, for example, fixed to the crankshaft in front of the starting clutch,
P2: the electric motor is arranged between a separating clutch, often referred to as K0, and the starting clutch but before the vehicle transmission in the drive train,
P3: the electric motor is arranged in the vehicle transmission and/or transmission output shaft,
P4: the electric motor is arranged on an existing or separate vehicle axle, and
P5: the electric motor is arranged on or in the vehicle wheel, for example as a wheel hub motor.

In an example embodiment of the disclosure, the hybrid module is configured as a P3 hybrid module.

Electrical machines are used to convert electrical energy into mechanical energy and/or vice versa, and generally comprise a stationary part referred to as a stator or armature, and a part referred to as a rotor and arranged movably relative to the stationary part.

In the case of electrical machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. In connection with the disclosure, an electrical machine is designed as a radial flux machine.

The electrical machine is intended in particular for use within a drive train of a hybrid or fully electric motor vehicle.

In particular, the electrical machine is dimensioned in such a way that vehicle speeds of more than 50 km/h, for example, more than 80 km/h, or in a further example embodiment, even more than 100 km/h can be achieved. The electric motor can have an output of more than 30 kW, for example, more than 50 kW, or, in a further example embodiment, more than 70 kW. Furthermore, the electrical machine can provide speeds greater than 5,000 rpm, for example, greater than 10,000 rpm, or in a further example embodiment, greater than 12,500 rpm.

A cooling system is used to dissipate the heat generated by electrical and mechanical losses within an electrical machine. Such a cooling system can have, among other things, cooling channels within the rotor (rotor cooling channel) and/or stator (stator cooling channel), through which a corresponding cooling medium is guided, for example by means of a fluid pump, for the purpose of dissipating the heat.

According to a further development of the disclosure, it can also be provided that the closed first coolant circuit is configured for cooling at least one second electrical machine, and that the method comprises the additional steps:
a7. providing a seventh signal which represents the temperature of the second electrical machine,
a8. providing an eighth signal which represents a reference temperature of the second electrical machine,
a9. providing a ninth signal which represents the number of revolutions of the second electrical machine,
a10. providing a tenth signal which represents a reference number of revolutions of the second electrical machine, and
e2. carrying out a comparison as to whether the temperature of the second electrical machine is less than, or less than or equal to the reference temperature of the second electrical machine, and
f2. if the condition is not met, selecting the pump speed for the first fluid pump, which corresponds to a fifth pump speed that can be read from a memory of the control unit,
g2. carrying out a comparison as to whether the number of revolutions of the second electrical machine is less than, or less than or equal to the reference number of revolutions of the second electrical machine, and h2. if the condition is not met, selecting the pump speed for the first fluid pump, which corresponds to a sixth pump speed that can be read from a memory of the control unit.

It can hereby be achieved that two electrical machines, in particular a P3 hybrid module, can be effectively cooled by means of a coolant circuit.

Furthermore, according to an equally advantageous embodiment of the disclosure, it can be provided that the cooling system comprises a second closed coolant circuit with a second cooling fluid and a second fluid pump for conveying the second cooling fluid through the second coolant circuit and for cooling the first electrical machine and/or the second an electrical machine, wherein the control unit is connected to the second fluid pump in order to control the pump speed, wherein the first closed coolant circuit and the second closed coolant circuit are coupled to one another via a heat exchanger, and in that the method comprises the additional steps:

- a11. providing an eleventh signal, which represents the temperature of the second cooling fluid,
- b2. carrying out a comparison as to whether the temperature of the second cooling fluid is less than, or less than or equal to the reference temperature of the second cooling fluid, and
- c2. if the condition is met, selecting the pump speed for the second fluid pump, which corresponds to a seventh pump speed that can be read from a memory of the control unit, or
- d2. if the condition is not met, selecting the pump speed for the second fluid pump, which corresponds to an eighth pump speed that can be read from a memory of the control unit,
- e3. carrying out a comparison as to whether the temperature of the first electrical machine and/or the second electrical machine is less than, or less than or equal to the reference temperature of the first electrical machine and/or the second electrical machine, and
- f3. if the condition is not met, selecting the pump speed for the second fluid pump, which corresponds to a ninth pump speed that can be read from a memory of the control unit,
- i2. generating a control signal for the second fluid pump by means of the control unit, which sets the fluid pump to the selected pump speed.

The advantageous effect of this configuration is based on the fact that the second coolant circuit allows for even better control of the cooling of the electrical machines.

In this context, the pump speeds that can be read from the memory of the control unit can have the following relationship to one another:

- the seventh pump speed that can be read from a memory of the control unit is lower than the eighth pump speed that can be read from a memory of the control unit, and/or
- the eighth pump speed that can be read from a memory of the control unit is lower than the ninth pump speed that can be read from a memory of the control unit, and/or
- the ninth pump speed that can be read from a memory of the control unit is equal to the tenth pump speed that can be read from a memory of the control unit.

The first coolant circuit can in particular have oil as the first cooling fluid and the second coolant circuit can have cooling water as the second cooling fluid. The second coolant circuit can also be connected to other components or assemblies for their cooling, which in particular are not located in or on a hybrid module of the motor vehicle.

According to a further embodiment of the disclosure, it can be provided that a heat source to be cooled, in particular a power electronics of the first electrical machine and/or the second electrical machine, is arranged in the second closed coolant circuit between the second fluid pump and the heat exchanger. This in particular allows for further improvement to the efficient and safe cooling of the electrical machines or their components to be achieved.

Furthermore, the disclosure can also be further developed such that the first signal, which represents the temperature of the first cooling fluid, and/or the third signal, which represents the temperature of the first electrical machine, and/or the fifth signal, which represents the number of revolutions of the first electrical machine, and/or the seventh signal, which represents the temperature of the second electrical machine, and/or the ninth signal, which represents the number of revolutions of the second electrical machine, is a measurement signal from a sensor.

Alternatively or additionally, it is also possible for signals to be provided by the control unit by calculation or estimation and not by measurement.

In a likewise embodiment variant of the disclosure, it can also be provided that the second signal, which represents the reference temperature of the first cooling fluid, represents a temperature between 75° C.-95° C., and/or the fourth signal, which represents the reference temperature of the first electrical machine, represents a temperature between 120° C.-140° C., and/or the sixth signal, which represents the reference number of revolutions of the first electrical machine, represents between 8,000 rpm-15,000 rpm, and/or the eighth signal, which represents a reference temperature of the second electrical machine temperature between 120° C.-140° C., and/or the tenth signal, which represents a reference number of revolutions of the second electrical machine, represents a number of revolutions between 8,000 rpm-15,000 rpm.

As a result, the electrical machine or machines can be operated safely and cooled effectively.

According to an embodiment of the disclosure, it can be provided that the method steps b1, b2, c1, c2, d1, d2, e1, e2, e3, f1, f2, f3, g1, g2, h1, h2 are carried out in a processor unit of the control unit of the cooling system. The advantage of this configuration is that a compact structure can be achieved as a result, and the assembly and cabling on an electrical machine or a hybrid module can be simplified.

The object of the disclosure is also achieved by a cooling system of a first electrical machine within a drive train of a motor vehicle, the cooling system comprising a first closed coolant circuit having a first cooling fluid and a first fluid pump for conveying the first cooling fluid through the first coolant circuit and for cooling at least the first electrical machine, and a control unit which is connected to the first fluid pump in order to control the pump speed. The control unit comprises a processor and a memory containing computer program code, and the memory and the computer program code are configured with the processor to cause the control unit to carry out a method described herein.

The object of the disclosure is also achieved by a control unit for controlling a cooling system of a first electrical machine within a drive train of a motor vehicle, the control unit comprising a processor and a memory containing computer program code. The memory and the computer program code are configured with the processor to cause the control unit to carry out a method described herein.

Finally, the object of the disclosure is also achieved by a computer program product that is stored on a machine-readable carrier, or a computer data signal embodied by an electromagnetic wave, with program code that is suitable for carrying out the method described herein.

BRIEF DESCRIPTION OF THE DRAWINGS

The disclosure will be explained in more detail below with reference to figures without limiting the general concept of the disclosure.
In the Figures.

DETAILED DESCRIPTION

Figure 1:
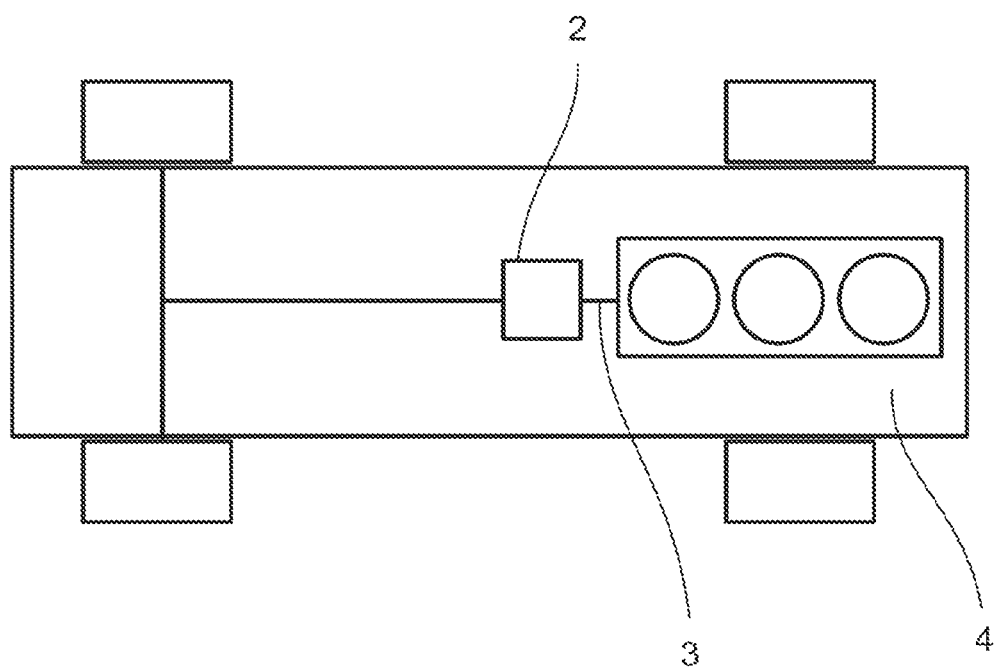
FIG. 1 shows a motor vehicle with a hybrid drive train.

FIG. 1 shows a motor vehicle 4 with a hybrid drive train 3.

The drive train 3 has at least one first electrical machine 2. The electrical machine 2 can be installed in a P3 hybrid module and integrated in the drive train 3.

Figure 2:
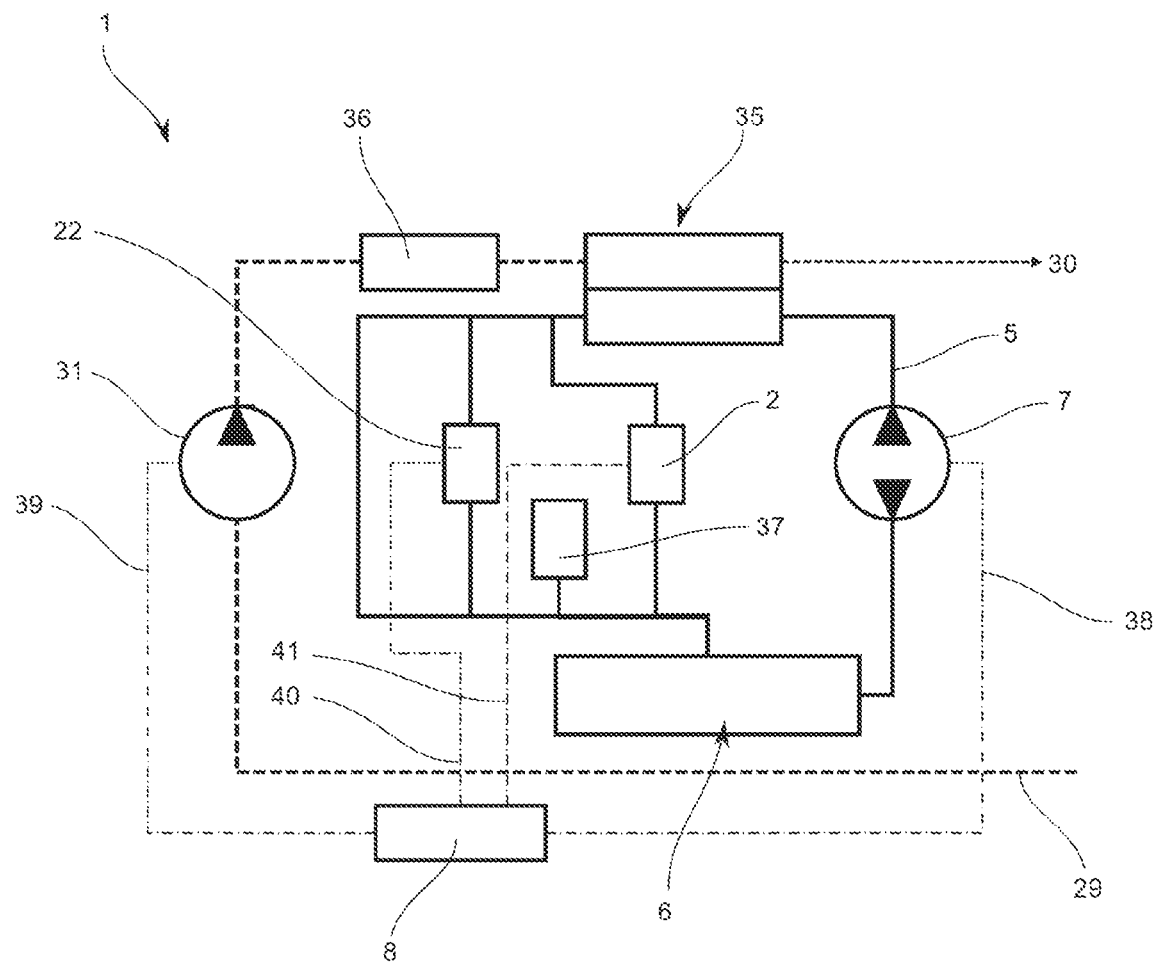
FIG. 2 shows a block diagram of a cooling system.

A cooling system 1 for cooling such a P3 hybrid module is shown in FIG. 2. The cooling system 1 comprises a first closed coolant circuit 5 with a first cooling fluid 6 and a first fluid pump 7 for conveying the first cooling fluid 6 through the first coolant circuit 5 and for cooling at least the first electrical machine 2, as well as a control unit 8 which is connected to the first fluid pump 7 via the signal connection 38 in order to control the pump speed. In particular, a control signal from the control unit 8 for setting a pump speed can be transmitted to the first fluid pump 38 via the signal line 38. A cooling oil is used as the first cooling fluid 6 in the example shown.

FIG. 2 also clearly shows that the closed oil coolant circuit 5 is configured for cooling at least one second electrical machine 22. Furthermore, a clutch 37, for example a separating clutch, can also be located in the first coolant circuit 5.

The cooling system 1 comprises a second closed coolant circuit 29 with a second cooling fluid 30 and a second fluid pump 31 for conveying the second cooling fluid 30 through the second coolant circuit 29 and for cooling the first electrical machine 2 and the second electrical machine 22, wherein the control unit 8 is connected to the second fluid pump 31 in order to control the pump speed, wherein the first closed coolant circuit 5 and the second closed coolant circuit 29 are coupled to one another via a heat exchanger 35. FIG. 2 also shows that a heat source 36 to be cooled, in particular a power electronics of the first electrical machine 2 and/or the second electrical machine 22, is arranged in the second closed coolant circuit 29 between the second fluid pump 31 and the heat exchanger 35. In the example shown, the power electronics, which are connected to the two electrical machines 2, 22, are cooled as a heat source 36 by the coolant circuit 29 operated with cooling water.

The second fluid pump 31 is connected to the control unit 8 via the signal line 39. The first and second electrical machines 2, 22 are also coupled to the control unit 8 via the signal lines 40, 41, wherein in particular signals representing a number of revolutions of one or both of the electrical machines 2, 22 are transmitted from the electrical machines 2, 22 to the control unit 8. Furthermore, signals that represent a temperature of one or both of the electrical machines 2, 22 can also be transmitted in this way.

A method for controlling the cooling system 1 of the electrical machines 2, 22 within a drive train 3 of a motor vehicle 4 will now be described with reference to FIGS. 3-5.

Figure 3:
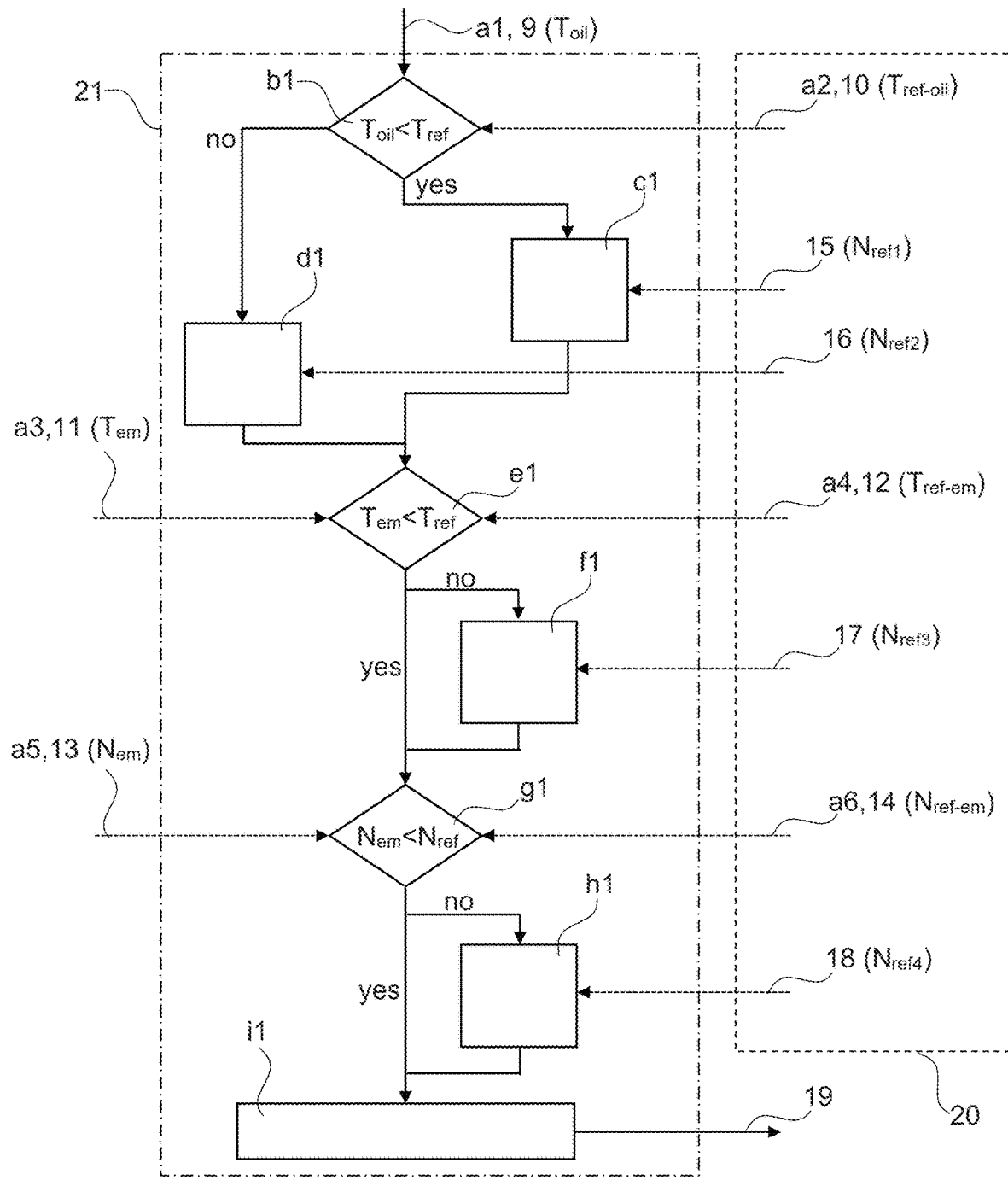
FIG. 3 shows a flowchart of a first embodiment of a method for controlling a cooling system.

A first method for controlling the cooling system 1 is shown in FIG. 3. First of all—as can also be seen in FIG. 3—the necessary operating parameters for carrying out the method are made available. A detailed description of these method steps is outlined below:
- a1. providing a first signal 9 which represents the temperature of the first cooling fluid 6,
- a2. providing a second signal 10 which represents a reference temperature of the first cooling fluid 6,
- a3. providing a third signal 11 which represents the temperature of the first electrical machine 2,
- a4. providing a fourth signal 12 which represents a reference temperature of the first electrical machine 2,
- a5. providing a fifth signal 13 which represents the number of revolutions of the first electrical machine 2, and
- a6. providing a sixth signal 14 which represents a reference number of revolutions of the first electrical machine 2, In a method step b1, a comparison is then carried out as to whether the temperature of the first cooling fluid 6 is less than, or less than or equal to the reference temperature of the first cooling fluid 6. For example, it is checked whether the temperature of the cooling oil exceeds 85° C.

If the above-mentioned condition is met, the method step referred to as c1 takes place, wherein the pump speed is selected for the first fluid pump 7, which corresponds to a second pump speed 15 that can be read from a memory 20 of the control unit 8. In this case, a comparatively low pump speed is selected so that the electrical machine can be brought quickly to its operating temperature by setting the cooling capacity of the cooling system 1 to be comparatively low.

If the temperature of the first cooling fluid 6 is above the reference temperature, i.e., if the above-mentioned condition is not met, then in method step d1 the pump speed is selected for the first fluid pump 7, which corresponds to a second pump speed 16 that can be read from a memory 20 of the control unit 8. This pump speed is higher than the pump speed of method step c1, so that the cooling system 1 is operated with a correspondingly greater cooling capacity.

Furthermore, at the same time or with a slight time delay, a method step e1 takes place, in which a comparison is carried out as to whether the temperature of the first electrical machine 2 is less than, or less than or equal to the reference temperature of the first electrical machine 2. In this case, the reference temperature can in particular represent a critical operating temperature for the electrical machine.

If the condition is not met, in step f1 the pump speed is selected for the first fluid pump 7, which corresponds to a third pump speed 17 that can be read from a memory 20 of the control unit 8. This third pump speed is greater than the first and second pump speeds from method steps c1 and d1. The cooling capacity of the cooling system 1 is thus increased when the electrical machine 2 is at a critical operating temperature.

In addition to the temperature of the electrical machine, at the same time or with a slight time delay, in a method step g1 a comparison is carried out as to whether the number of revolutions of the first electrical machine 2 is less than, or less than or equal to the reference number of revolutions of the electrical machine 2. The reference number of revolutions can correspond in particular to between 0.75-1.0 of the permissible maximum number of revolutions of the electrical machine.

If the above condition is not met, a method step h1 takes place, in which the pump speed is selected for the first fluid pump 7, which corresponds to a fourth pump speed 18 that can be read from a memory 20 of the control unit 8. This fourth pump speed corresponds to the third pump speed, as specified in step f1. The pump speed is thus also set to a high cooling capacity when a reference number of revolutions of the first electrical machine 2 is exceeded.

Finally, the present selected pump speed is transmitted to the first fluid pump 7 in step i1, wherein a control signal 19 for the first fluid pump 7 is generated by the control unit 8, which sets the fluid pump 7 to the selected pump speed.

Figure 4:
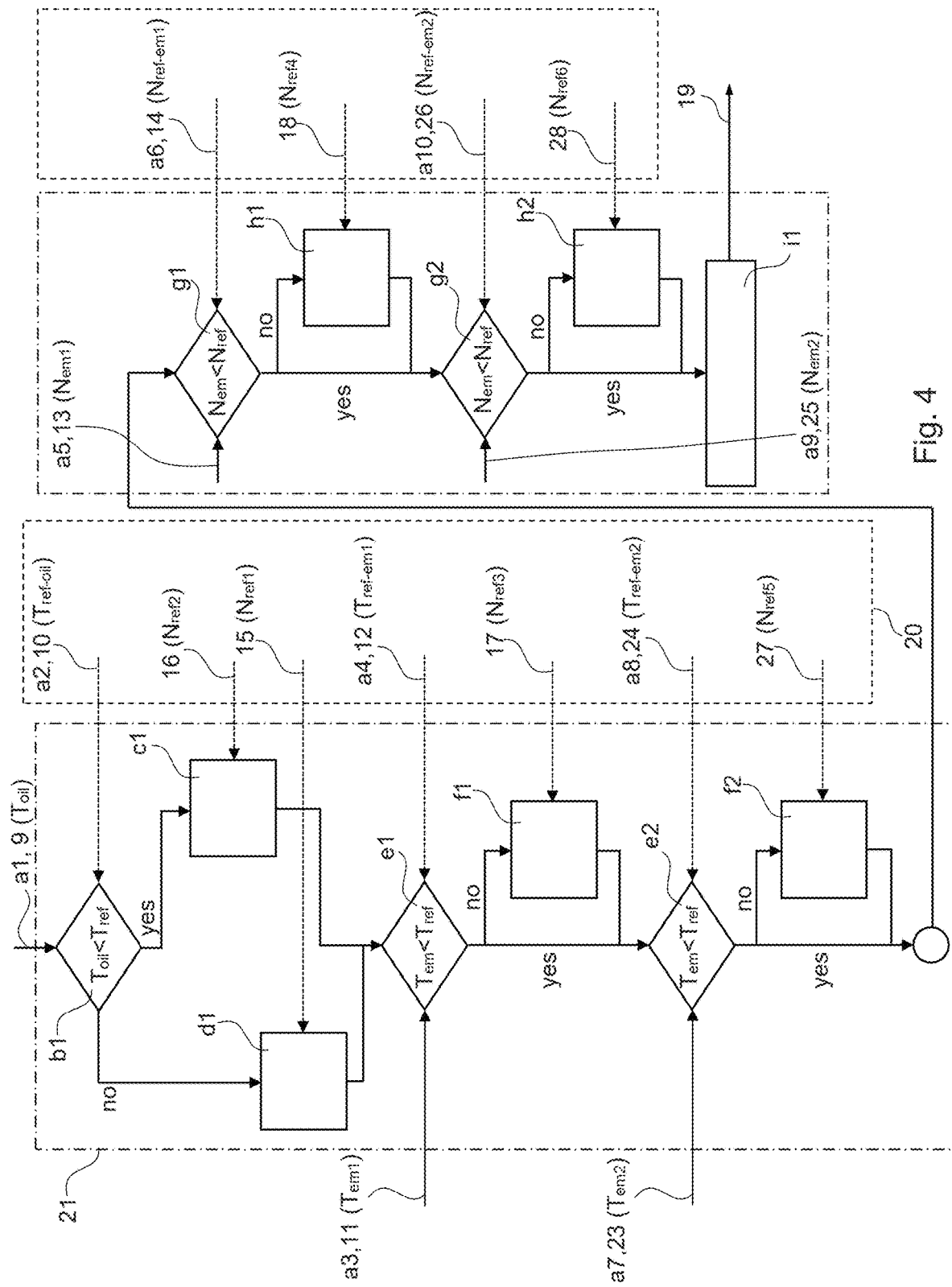
FIG. 4 shows a flowchart of a second embodiment of a method for controlling a cooling system.

A further embodiment of a method for controlling a cooling system 1 is shown in FIG. 4, in which a second electrical machine 22 is now also cooled. FIG. 4 shows that the closed oil coolant circuit 5 is configured for cooling at least one second electrical machine 22, and the method, with regard to the method shown in FIG. 3, includes the following additional steps:

In a method step a7, a seventh signal 23 is provided, which represents the temperature of the second electrical machine 22; in a method step a8, an eighth signal is provided 24, which represents a reference temperature of the second electrical machine 22; in a method step a9, a ninth signal 25 is provided, which represents the number of revolutions of the second electrical machine 22; and in a method step a10, a tenth signal 26 is provided which represents a reference number of revolutions of the second electrical machine 22.

In a step e2, a comparison is then made as to whether the temperature of the second electrical machine 22 is less than, or less than or equal to the reference temperature of the second electrical machine 22, and if this condition is not met (f2), the pump speed is selected for the first fluid pump 7, which corresponds to a fifth pump speed 27 that can be read from a memory 20 of the control unit 8. This fifth pump speed 27 is identical to the third pump speed and achieves a correspondingly high cooling capacity of the cooling system.

Analogous to method step g1, in step g2, a comparison is carried out as to whether the number of revolutions of the second electrical machine 22 is less than, or less than or equal to the reference number of revolutions of the second electrical machine 22, and subsequently, if the condition is not met, in a method step h2, the pump speed is selected for the first fluid pump 7, which corresponds to a sixth pump speed 28 that can be read from a memory 20 of the control unit 8. This sixth pump speed 28 is also identical to the fifth pump speed 27.

Figure 5:
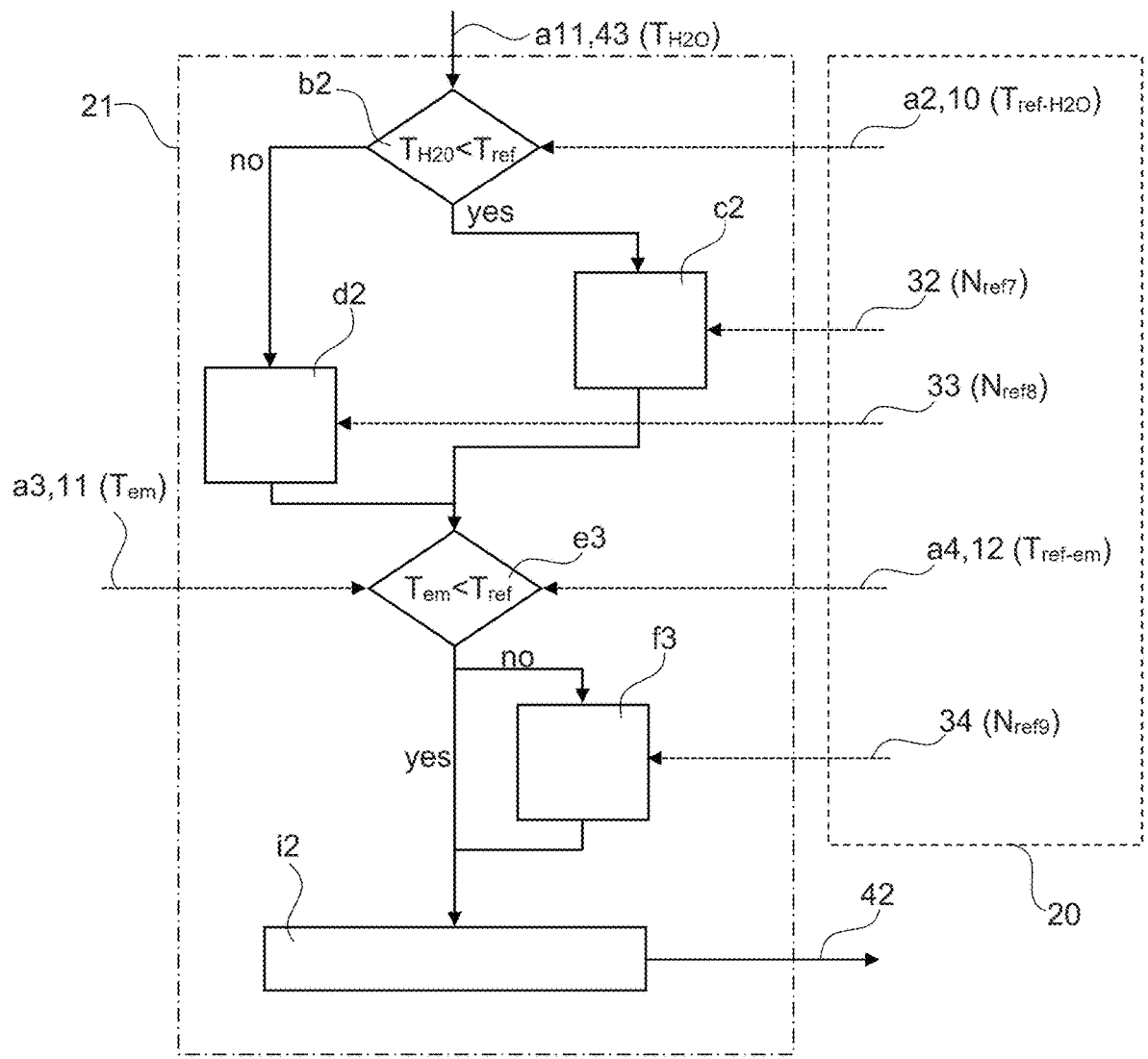
FIG. 5 shows a flow chart of a third embodiment of a method for controlling a cooling system.

FIG. 5 shows a method for controlling a cooling system 1 which—as shown in FIG. 2—has a second coolant circuit 29. This method comprises the following additional steps:

Firstly, in a method step referred to as a11, an eleventh signal 43 which represents the temperature of the second cooling fluid 30 is provided. In a method step b2, a comparison is then carried out as to whether the temperature of the second cooling fluid 30 is less than, or less than or equal to the reference temperature of the second cooling fluid 30, and if the condition is present (c2), the pump speed is selected for the second fluid pump 31, which corresponds to a seventh pump speed 32 that can be read from a memory 20 of the control unit 8, or, if the condition is not met (d2), the pump speed is selected for the second fluid pump 31, which corresponds to an eighth pump speed 33 that can be read from a memory 20 of the control unit 8. Analogously to the procedure in the first coolant circuit, it is therefore also checked whether the temperature of the cooling fluid (here cooling water) in the second coolant circuit is above a defined reference value and the cooling capacity of the second coolant circuit 29 is reduced by a corresponding number of revolutions of the second fluid pump 31 until this operating temperature is exceeded and a higher cooling capacity is required.

Then, in a method step e3, a comparison is carried out as to whether the temperature of the first electrical machine 2 and/or the second electrical machine 22 is less than, or less than or equal to the reference temperature of the first electrical machine 2 and/or the second electrical machine 22. In the example shown, the temperature in or at the power electronics 36 of the first and/or second electrical machine 2, 22 is used.

If the condition is not met, in step f3 the pump speed is chosen or selected for the second fluid pump 31, which corresponds to a ninth pump speed 34 that can be read from a memory 20 of the control unit 8. This is selected to be greater than the pump speeds 32, 33 used in steps c2 or d2.

Then, with method step i2, this causes the control unit 8 to generate a control signal 42 for the second fluid pump 31, which sets the fluid pump 31 to the selected pump speed.

In the examples shown, the first signal 9, which represents the temperature of the first cooling fluid 6, and the third signal 11, which represents the temperature of the first electrical machine 2, and the fifth signal 13, which represents the number of revolutions of the first electrical machine 2, and the seventh signal 23, which represents the temperature of the second electrical machine 22, and the ninth signal 25, which represents the number of revolutions of the second electrical machine 22, are each a measurement signal from a sensor, for example a corresponding temperature sensor or speed sensor.

The second signal 10, which represents the reference temperature of the first cooling fluid 6, represents a temperature between 75° C.-95° C., and the fourth signal 12, which represents the reference temperature of the first electrical machine 2, represents a temperature between 120° C.-140° C., and the sixth signal 14, which represents the reference number of revolutions of the first electrical machine 2, represents a number of revolutions between 8,000 rpm-15,000 rpm, and the eighth signal 24, which represents a reference temperature of the second electrical machine 22, represents a temperature between 120° C.-140° C., and the tenth signal 26, which represents the reference number of revolutions of the second electrical machine 22, represents a number of revolutions between 8,000 rpm and 15,000 rpm.

As can also be seen from FIGS. 3-5, the control unit 8 comprises a processor 21 and a memory 20, which contains a computer program code, wherein the memory 20 and the computer program code are configured with the processor 21 to cause the control unit 8 to carry out a method as described in FIGS. 3-5.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Cooling system
2 Electrical machine
3 Drive train
4 Motor vehicle
5 Coolant circuit
6 Cooling fluid
7 Fluid pump
8 Control unit
9 Signal
10 Signal
11 Signal
12 Signal
13 Signal
14 Signal
15 Pump speed
16 Pump speed
17 Pump speed
18 Pump speed
19 Control signal
20 Memory
21 Processor unit
22 Electrical machine
23 Signal
24 Signal
25 Signal
26 Signal
27 Pump speed
28 Pump speed
29 Coolant circuit
30 Cooling fluid
31 Fluid pump
32 Pump speed
33 Pump speed
34 Pump speed
35 Heat exchanger
36 Heat source
37 Clutch
38 Signal connection
39 Signal connection
40 Signal connection
41 Signal connection
42 Control signal
43 Signal

The invention claimed is:

1. A method for controlling a cooling system of a first electrical machine within a drive train of a motor vehicle, the cooling system comprising: i) a first closed coolant circuit having a first fluid pump configured for conveying a first cooling fluid through the first closed coolant circuit and for cooling at least the first electrical machine, and ii) a control unit connected to the first fluid pump and configured to control a pump speed of the first fluid pump, the method comprising:
 (a1) providing a first signal configured to correspond with a temperature of the first cooling fluid,
 (a2) providing a second signal configured to correspond with a reference temperature of the first cooling fluid,
 (a3) providing a third signal configured to correspond with a temperature of the first electrical machine,
 (a4) providing a fourth signal configured to correspond with a reference temperature of the first electrical machine,
 (a5) providing a fifth signal configured to correspond with a number of revolutions per minute of the first electrical machine,
 (a6) providing a sixth signal configured to correspond with a reference number of revolutions per minute of the first electrical machine,
 (b1) carrying out a comparison as to whether the temperature of the first cooling fluid is less than, or less than or equal to the reference temperature of the first cooling fluid, defining a first condition, and
 (c1) selecting a first pump speed for the first fluid pump via the control unit if the first condition is met, the first pump speed read from a memory of the control unit, or
 (d1) selecting a second pump speed for the first fluid pump via the control unit if the first condition is not met, the second pump speed read from a memory of the control unit,
 (e1) carrying out a comparison as to whether the temperature of the first electrical machine is less than, or less than or equal to the reference temperature of the first electrical machine, defining a second condition, and
 (f1) selecting a third pump speed for the first fluid pump via the control unit if the second condition is not met, the third pump speed read from a memory of the control unit,
 (g1) carrying out a comparison as to whether the number of revolutions per minute of the first electrical machine is less than, or less than or equal to the reference number of revolutions per minute of the first electrical machine, defining a third condition, and
 (h1) selecting a fourth pump speed for the first fluid pump via the control unit if the third condition is not met, the fourth pump speed read from a memory of the control unit, and
 (i1) generating a control signal via the control unit for the first fluid pump, the control signal configured to set the first fluid pump to any one of the first, second, third, or fourth pump speed.

2. The method according to claim 1, wherein the closed first coolant circuit is configured for cooling at least one second electrical machine, and the method further comprises:
 (a7) providing a seventh signal configured to correspond with a temperature of the at least one second electrical machine,
 (a8) providing an eighth signal configured to correspond with a reference temperature of the at least one second electrical machine,
 (a9) providing a ninth signal configured to correspond with a number of revolutions per minute of the at least one second electrical machine,
 (a10) providing a tenth signal configured to correspond with a reference number of revolutions per minute of the at least one second electrical machine, and
 (e2) carrying out a comparison as to whether the temperature of the at least one second electrical machine is less than, or less than or equal to the reference temperature of the at least one second electrical machine, defining a fourth condition, and
 (f2) selecting a fifth pump speed for the first fluid pump via the control unit if the fourth condition is not met, the fifth pump speed read from a memory of the control unit,
 (g2) carrying out a comparison as to whether the number of revolutions per minute of the at least one second electrical machine is less than, or less than or equal to the reference number of revolutions per minute of the at least one second electrical machine, defining a fifth condition, and (h2) selecting a sixth pump speed for the first fluid pump via the control unit if the fifth condition is not met, the sixth pump speed read from a memory of the control unit.

3. The method according to claim 2, wherein the cooling system further comprises a second closed coolant circuit having a second fluid pump configured for: i) conveying a second cooling fluid through the second closed coolant circuit, and ii) cooling at least one of the first electrical machine or the at least one second electrical machine, and the control unit is connected to the second fluid pump and configured to control a pump speed of the second fluid pump, and the first closed coolant circuit and the second closed coolant circuit are coupled to one another via a heat exchanger, and
the method further comprises:
  (a11) providing an eleventh signal configured to correspond with the temperature of the second cooling fluid,
  (b2) carrying out a comparison as to whether the temperature of the second cooling fluid is less than, or less than or equal to the reference temperature of the second cooling fluid, defining a sixth condition, and
  (c2) selecting a seventh pump speed for the second fluid pump via the control unit if the sixth condition is met, the seventh pump speed read from a memory of the control unit, or
  (d2) selecting an eighth pump speed for the second fluid pump via the control unit if the sixth condition is not met, the eighth pump speed read from a memory of the control unit,
  (e3) carrying out a comparison as to whether at least one of the temperature of the first electrical machine or the temperature of the at least one second electrical machine is less than, or less than or equal to, respectively, the reference temperature of the first electrical machine or the reference temperature of the at least one second electrical machine, defining a seventh condition, and
  (f3) selecting a ninth pump speed for the second fluid pump via the control unit if the seventh condition is not met, the ninth pump speed read from a memory of the control unit, and
  (i2) generating a control signal via the control unit for the second fluid pump, the control signal configured to set the second fluid pump to any one of the seventh, eighth, or ninth pump speed.

4. The method according to claim 3, wherein a power electronics of at least one of: i) the first electrical machine or, ii) the at least one second electrical machine, is arranged in the second closed coolant circuit between the second fluid pump and the heat exchanger.

5. The method according to claim 3, wherein steps b1, b2, c1, c2, d1, d2, e1, e2, e3, f1, f2, f3, g1, g2, h1, h2 are carried out in a processor unit of the control unit of the cooling system.

6. The method of claim 3, further comprising the first cooling fluid and the second cooling fluid, and the first cooling fluid is oil, and the second cooling fluid comprises water.

7. The method according to claim 2, wherein at least one of:
  the first signal configured to correspond with the temperature of the first cooling fluid, or
  the third signal configured to correspond with the temperature of the first electrical machine, or
  the fifth signal configured to correspond with the number of revolutions per minute of the first electrical machine, or
  the seventh signal configured to correspond with the temperature of the second electrical machine, or
  the ninth signal configured to correspond with the number of revolutions per minute of the second electrical machine,
is a measurement signal of a sensor.

8. The method according to claim 2, wherein at least one:
  the second signal configured to correspond with the reference temperature of the first cooling fluid represents a temperature between 75° C.-95° C., or
  the fourth signal configured to correspond with the reference temperature of the first electrical machine represents a temperature between 120° C.-140° C., or
  the sixth signal configured to correspond with the reference number of revolutions per minute of the first electrical machine represents a number of revolutions per minute between 8,000 rpm-15,000 rpm, or
  the eighth signal configured to correspond with a reference temperature of the second electrical machine represents a temperature between 120° C.-140° C., or
  the tenth signal configured to correspond with a reference number of revolutions per minute of the second electrical machine represents a number of revolutions per minute between 8,000 rpm-15,000 rpm.

9. The method of claim 1, further comprising the first cooling fluid, and the first cooling fluid is oil.

10. A cooling system configured for at least one of a first electrical machine or a second electrical machine arranged within a drive train of a motor vehicle, the cooling system comprising:
  a first closed coolant circuit having a first cooling fluid and a first fluid pump configured for: i) conveying the first cooling fluid through the first closed coolant circuit, and ii) cooling at least one of the first electrical machine or the second electrical machine, and
  a control unit connected to the first fluid pump and configured to control a pump speed of the first fluid pump, and
  wherein
  the control unit comprises a processor and a memory having a computer program code, and the memory and the computer program code are configured with the processor to cause the control unit to carry out a method according to claim 1.

11. A control unit configured for controlling a cooling system of a first electrical machine within a drive train of a motor vehicle, the control unit comprising a processor and a memory containing a computer program code, wherein the memory and the computer program code are configured with the processor to cause the control unit to carry out a method according to claim 1.

12. A non-transitory computer medium embedded with instructions which when executed cause a processor to perform the method of claim 1.

13. A method for controlling a cooling system of a first electrical machine within a drive train of a motor vehicle, the cooling system comprising: i) a first closed coolant circuit having a first fluid pump configured for conveying a first cooling fluid through the first closed coolant circuit and for cooling at least the first electrical machine, and ii) a control unit connected to the first fluid pump and configured to control a pump speed of the first fluid pump, the method comprising:

providing a first signal configured to correspond with a temperature of the first cooling fluid,
providing a second signal configured to correspond with a reference temperature of the first cooling fluid,
providing a third signal configured to correspond with a temperature of the first electrical machine,
providing a fourth signal configured to correspond with a reference temperature of the first electrical machine,
providing a fifth signal configured to correspond with a number of revolutions per minute of the first electrical machine,
providing a sixth signal configured to correspond with a reference number of revolutions per minute of the first electrical machine,
carrying out a comparison of the temperature of the first cooling fluid and the reference temperature of the first cooling fluid to determine if a first condition is met or not met, and
selecting a first pump speed for the first fluid pump via the control unit if the first condition is met, or
selecting a second pump speed for the first fluid pump via the control unit if the first condition is not met,
carrying out a comparison of the temperature of the first electrical machine and the reference temperature of the first electrical machine to determine if a second condition is met or not met, and
selecting a third pump speed for the first fluid pump via the control unit if the second condition is not met,
carrying out a comparison of the number of revolutions per minute of the first electrical machine and the reference number of revolutions per minute of the first electrical machine to determine if a third condition is met or not met, and
selecting a fourth pump speed for the first fluid pump via the control unit if the third condition is not met, and
generating a control signal via the control unit for the first fluid pump, the control signal configured to set the first fluid pump to any one of the first, second, third, or fourth pump speed.

14. The method according to claim 13, wherein the closed first coolant circuit is configured for cooling at least one second electrical machine, and the method further comprises:
providing a seventh signal configured to correspond with a temperature of the at least one second electrical machine,
providing an eighth signal configured to correspond with a reference temperature of the at least one second electrical machine,
providing a ninth signal configured to correspond with a number of revolutions per minute of the at least one second electrical machine,
providing a tenth signal configured to correspond with a reference number of revolutions per minute of the at least one second electrical machine, and
carrying out a comparison of the temperature of the at least one second electrical machine and the reference temperature of the at least one second electrical machine to determine if a fourth condition is met or not met, and
selecting a fifth pump speed for the first fluid pump via the control unit if the fourth condition is not met,
carrying out a comparison of the number of revolutions per minute of the at least one second electrical machine and the reference number of revolutions per minute of the at least one second electrical machine to determine if a fifth condition is met or not met, and
selecting a sixth pump speed for the first fluid pump via the control unit if the fifth condition is not met.

15. The method according to claim 14, wherein the cooling system further comprises a second closed coolant circuit having a second fluid pump configured for: i) conveying a second cooling fluid through the second closed coolant circuit, and ii) cooling at least one of the first electrical machine or the at least one second electrical machine, and the control unit is connected to the second fluid pump and configured to control a pump speed of the second fluid pump, and the first closed coolant circuit and the second closed coolant circuit are coupled to one another via a heat exchanger, and the method further comprises:
providing an eleventh signal configured to correspond with the temperature of the second cooling fluid,
carrying out a comparison of the temperature of the second cooling fluid and the reference temperature of the second cooling fluid to determine if a sixth condition is met or not met, and
selecting a seventh pump speed for the second fluid pump via the control unit if the sixth condition is met, or
selecting an eighth pump speed for the second fluid pump via the control unit if the sixth condition is not met,
carrying out a comparison of: i) the temperature of the first electrical machine or the temperature of the at least one second electrical machine and, ii) respectively, the reference temperature of the first electrical machine or the reference temperature of the at least one second electrical machine, to determine if a seventh condition is met or not met,
selecting a ninth pump speed for the second fluid pump via the control unit if the seventh condition is not met, and
generating a control signal via the control unit for the second fluid pump, the control signal configured to set the second fluid pump to any one of the seventh, eighth, or ninth pump speed.

16. The method according to claim 15, wherein a power electronics of at least one of: i) the first electrical machine, or ii) the at least one second electric machine, is arranged in the second closed coolant circuit between the second fluid pump and the heat exchanger.

17. The method of claim 15, further comprising the first cooling fluid and the second cooling fluid, and the first cooling fluid is oil, and the second cooling fluid comprises water.

18. The method according to claim 14, wherein at least one of:
the first signal configured to correspond with the temperature of the first cooling fluid, or
the third signal configured to correspond with the temperature of the first electrical machine, or
the fifth signal configured to correspond with the number of revolutions per minute of the first electrical machine, or
the seventh signal configured to correspond with the temperature of the second electrical machine, or
the ninth signal configured to correspond with the number of revolutions per minute of the second electrical machine,
is a measurement signal of a sensor.

19. The method according to claim 14, wherein at least one:
the second signal configured to correspond with the reference temperature of the first cooling fluid represents a temperature between 75° C.-95° C., or the fourth signal configured to correspond with the reference temperature of the first electrical machine represents a temperature between 120° C.-140° C., or the sixth signal configured to correspond with the reference number of revolutions per minute of the first electrical machine represents a number of revolutions per minute between 8,000 rpm-15,000 rpm, or the eighth signal configured to correspond with a reference temperature of the second electrical machine represents a temperature between 120° C.-140° C., or the tenth signal configured to correspond with a reference number of revolutions per minute of the second electrical machine represents a number of revolutions per minute between 8,000 rpm-15,000 rpm.

20. The method of claim 13, further comprising the first cooling fluid, and the first cooling fluid is oil.

* * * * *